(12) United States Patent
Willis

(10) Patent No.: US 6,203,195 B1
(45) Date of Patent: Mar. 20, 2001

(54) HOLDER FOR DENTAL SENSORS

(75) Inventor: Timothy G. Willis, 5104 Schulmeyer, Yreka, CA (US) 96097

(73) Assignee: Timothy G. Willis, Yreka, CA (US)

( * ) Notice: Subject to any disclaimer, the term of this patent is extended or adjusted under 35 U.S.C. 154(b) by 0 days.

(21) Appl. No.: 09/234,776

(22) Filed: Jan. 20, 1999

(51) Int. Cl.[7] ........................................................ A61B 6/14
(52) U.S. Cl. ............................................ 378/168; 378/170
(58) Field of Search .................................... 378/167, 168, 378/169, 170, 189, 190, 191, 98.8

(56) References Cited

U.S. PATENT DOCUMENTS

| | | | |
|---|---|---|---|
| 4,945,553 | 7/1990 | Willis | 378/168 |
| 4,965,885 | * 10/1990 | Fuhrmann | 378/168 |
| 5,090,047 | * 2/1992 | Angotti et al. | 378/170 |
| 5,256,982 | 10/1993 | Willis | 378/168 |
| 5,625,666 | 4/1997 | Willis | 378/167 |
| 5,799,058 | 8/1998 | Willis et al. | 378/168 |

* cited by examiner

Primary Examiner—David P. Porta
(74) Attorney, Agent, or Firm—Flehr Hohbach Test Albritton & Herbert LLP

(57) ABSTRACT

Dental sensors receive X-rays and transmit signals showing the condition of a patients's teeth to a computer or other recorder, thereby replacing X-ray film packets. Such sensors vary in dimensions. Holders are provided which accommodate such variations. Thus, a clasp engaging one edge of a sensor is adjustably movable to cause a fixed portion of the holder to engage the opposite edge of the sensor. Interfitting ratchet teeth on clasp and holder retain the parts in the required position. The holder assists in properly and rapidly locating the sensor relative to the teeth being examined. For certain usages a bite block holds the patient's jaws apart. The sides of the bite blocks are non-parallel, thereby reducing the shadows of such sides on the X-ray usage.

26 Claims, 6 Drawing Sheets

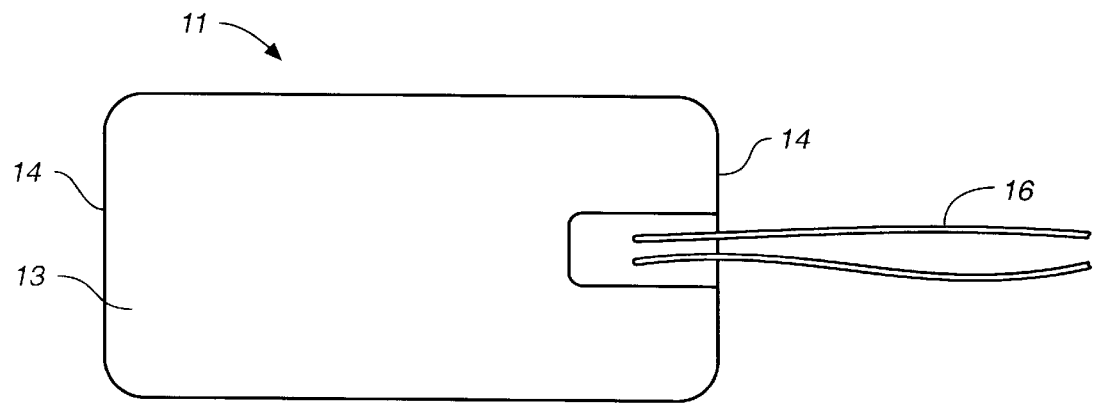
FIG._1 (PRIOR ART)
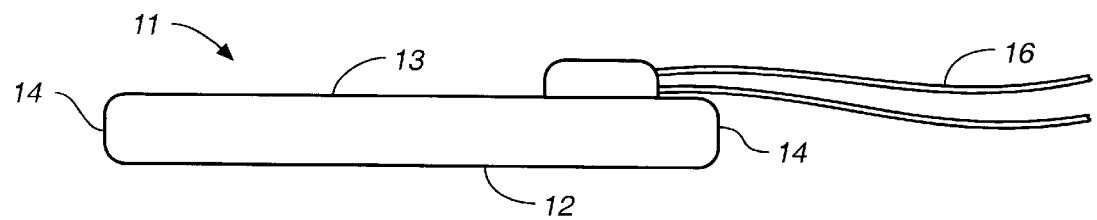
FIG._2 (PRIOR ART)

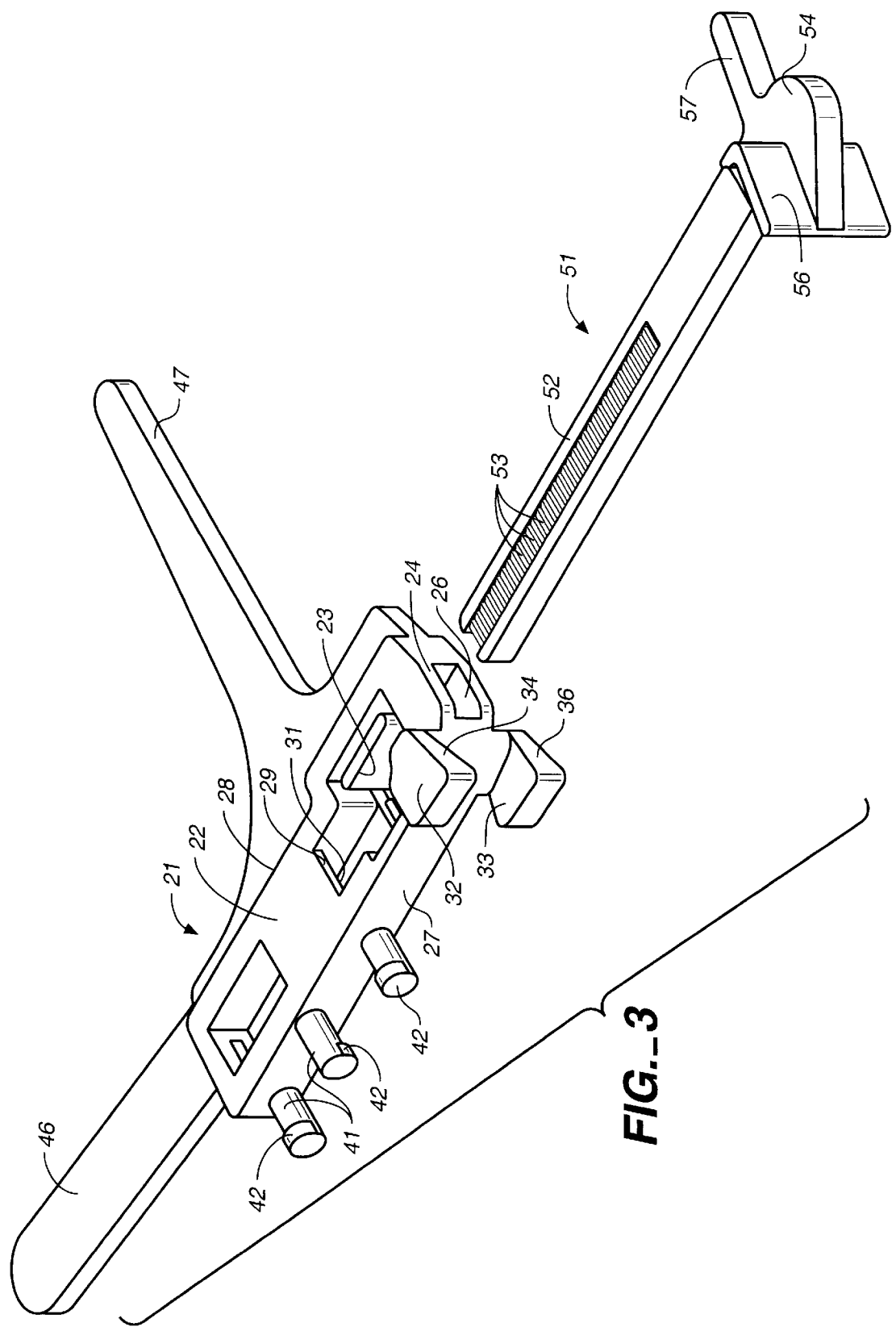
FIG._3

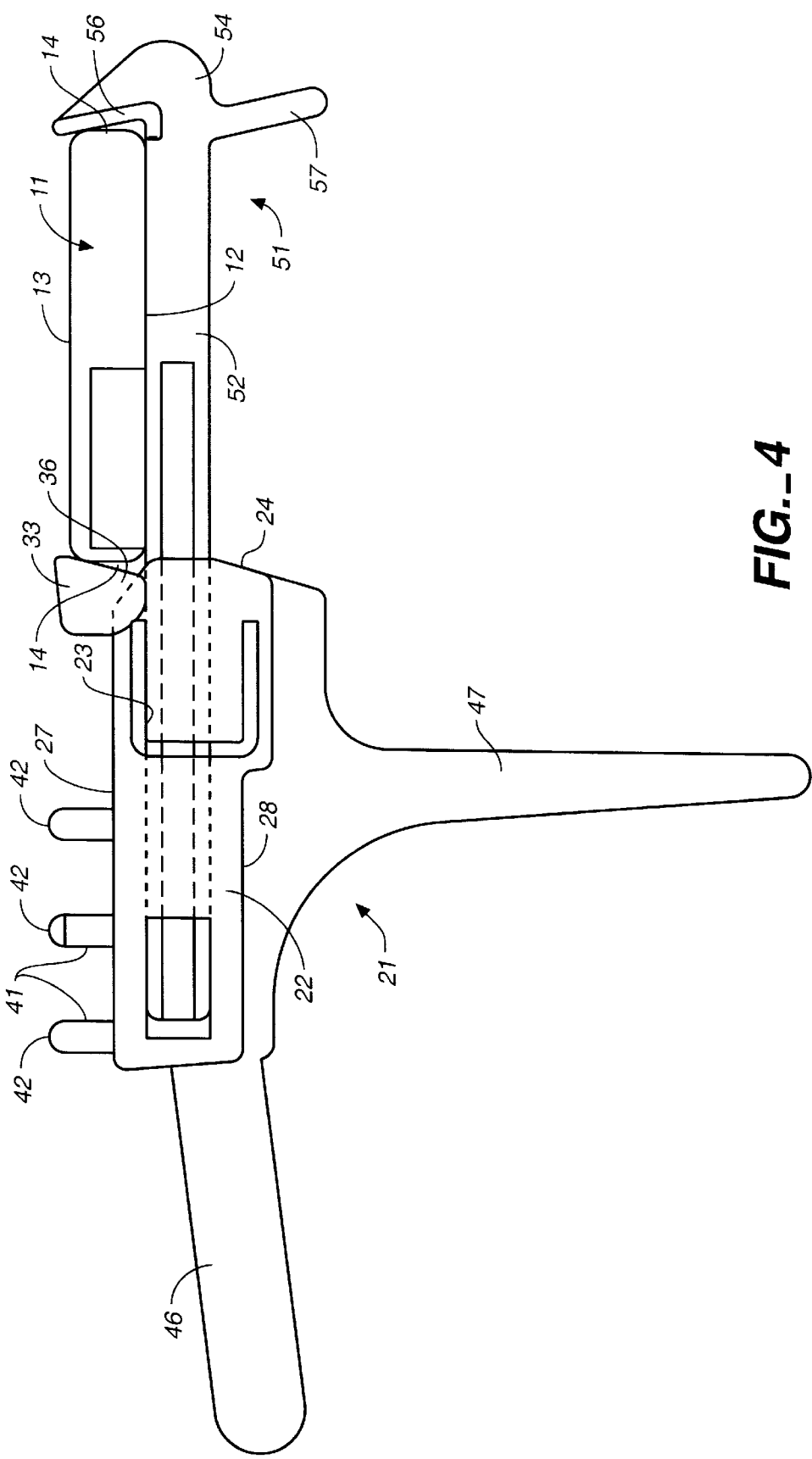
FIG._4

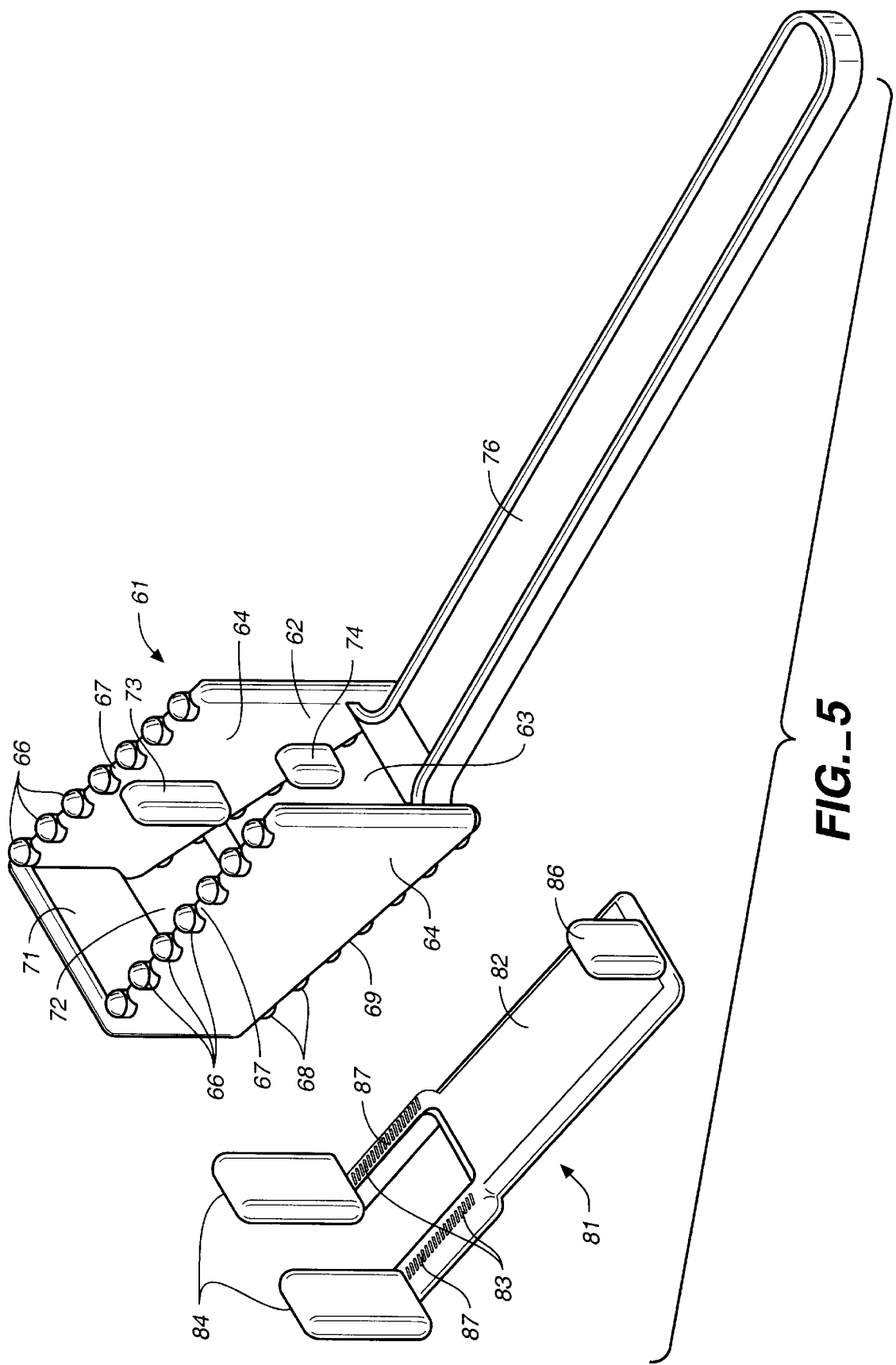
FIG._5

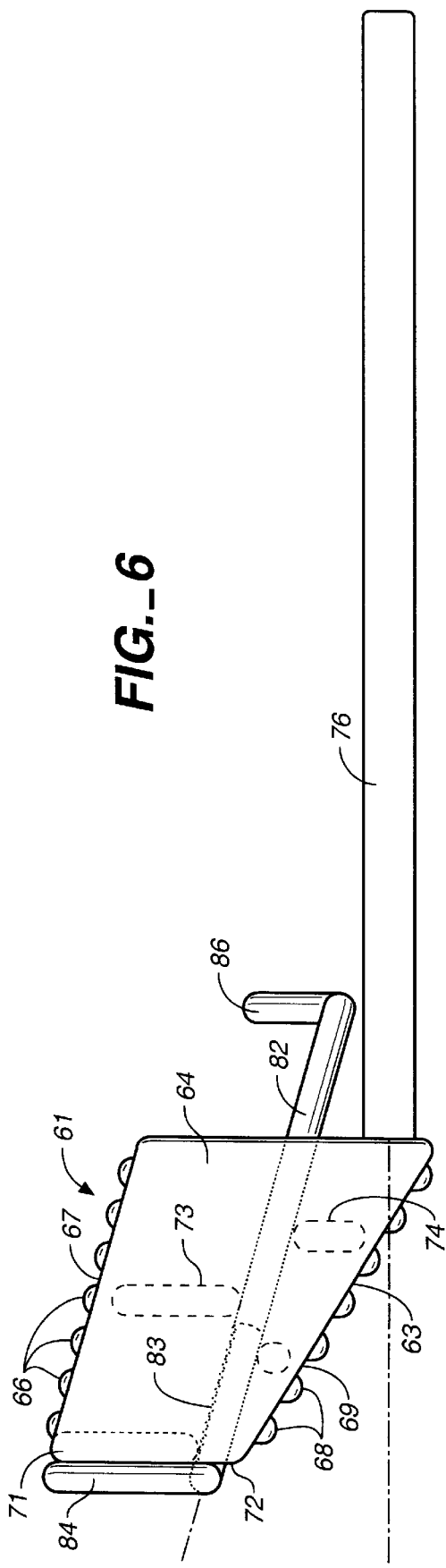

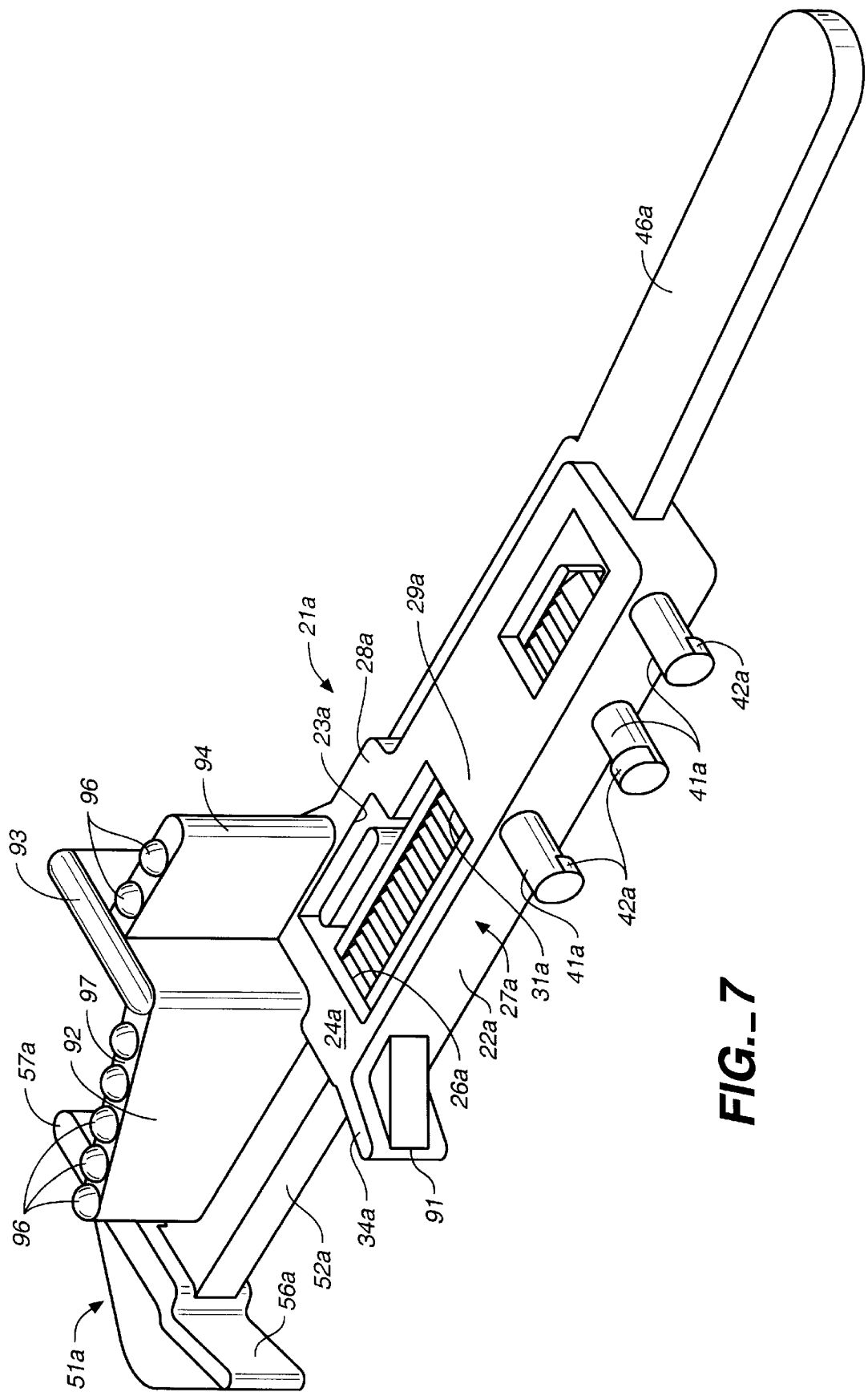
FIG._7

HOLDER FOR DENTAL SENSORS

BACKGROUND OF THE INVENTION

1. Field of the Invention.

This invention relates to a new and improved holder for dental sensors. More particularly, the invention relates to holders for sensors of the type which receive dental X-rays and which, in turn, transmit signals to a computer or other digital recorder, thereby eliminating the need for use of X-ray film.

2. Related Art

Applicant's prior U.S. Pat. Nos. 4,945,553; 5,256,982; 5,625,666; and 5,799,058 disclose holders for radiographic film packets. The present invention provides holders for X-ray sensors of various commercial types. Since such sensors differ in dimensions, a particular feature in the present invention is the adjustability of the holder to accommodate different shapes of sensors.

SUMMARY OF THE INVENTION

Sensors commercially available at the present time are not standardized as to thickness, width or length. The present invention is adjustable to accommodate such variations. More particularly, the holder grips one edge of the sensor with a fixed clamp jaw. The opposite edge of the sensor is clamped by an adjustable, movable jaw. A preferred means for holding the movable clamp jaw in place is by means of ratchet teeth.

Holders used in endodontic surgery are provided with bite blocks which prevent the patient from closing his jaws when root canal files are in position in one or more teeth. In applicant's prior patents, the sides of such bite blocks are shown parallel to each other. The sides tend to impose shadows on the X-ray images either on film or sensors. The depth of such shadows is reduced in accordance with the present invention by angling the sides rather than making them parallel. Accordingly, the X-rays do not penetrate the entire length of the sides but only portions of the lengths thereof, thereby reducing the degree of the shadows.

The features and advantages of the inventions described in applicant's hereinbefore mentioned prior U.S. Patents are present in the present invention and are not repeated.

BRIEF DESCRIPTION OF THE DRAWINGS

The accompanying drawings, which are incorporated in and form a part of this specification, illustrate embodiments of the invention and, together with the description serve to explain the principles of the invention.

FIG. 1 is a front elevational view of one type of commercially available computer sensor with which the present invention may be used.

FIG. 2 is a plan view thereof.

FIG. 3 is an exploded perspective view of one type sensor retainer and clasp.

FIG. 4 is a side elevational view of the retainer of FIG. 3 assembled.

FIG. 5 is an exploded perspective view of a modified sensor retainer and clasp.

FIG. 6 is a side elevational view of the retainer of FIG. 5 assembled.

FIG. 7 is a side elevational view of another modified sensor retainer and clasp.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

It will be understood that sensors 11 with which the present invention is used are not presently standardized. One commercially available sensor is shown in FIGS. 1 and 2. One of the features of the invention is that the holders are adjustable to accommodate sensors 11 of different dimensions. The particular sensor shown in FIGS. 1 and 2 is manufactured by Schick Technologies, Inc. Model CMOS. Sensor 11 has a front 12, back 13 and side edges 14. At present such sensors 11 are connected to a computer or other electronic recorder by means of wires 16 attached to back 14. It will be understood, of course, that such wires 16 are attached at different positions and the present invention envisions the use of sensors which transmit signals to the computer by means other than wires.

Retaining device 21 shown in FIGS. 3–4 is similar in several respects to that shown in U.S. Pat. 5,256,982. Retainer 21 has a body 22 which is gripped by the teeth of the patient. Body 22 is formed with an irregularly shaped opening 23 defined by a distal end 24 formed with a first rectangular aperture 26, lingual side 27, labial side 28 and proximal end 29 which is formed with second rectangular aperture 31 aligned with aperture 26. Extending out from lingual side 27 are upper and lower projections 32 and 33. Projection 32 is formed with a slanted edge 34 which projects distally outwardly. Projection 33 is formed with a slanted edge 36 parallel to edge 34. Also projecting from the lingual side 27 are wire retaining pins 41 having staggered overhanging heads 42. Thus the wires 16 may be twined around the pins 41 and retained in position by heads 42 so that the wires do not interfere with the x-ray images.

Body 22 has a handle 46 extending proximally out between the teeth of the patient. For adjustment purposes, an arm 47 which also extends out from body 22 at right angles to handle 46 is used to properly adjust the retainer 21 in the jaws of the patient.

Clasp 51 has an elongated shank 52 which fits through the aligned apertures 26 and 27 and is engaged by a detent (not shown) within body 22 which holds the clasp 51 at the desired distance from distal end 24. At outer end 54 of shank 52 is a slanted edge 56, slanting in a direction opposite to edge 34, 36. There is also a grip 57 extending in a direction from end 54 opposite retainer 56 for adjustment of clasp 51 inwardly and outwardly relative to retainer 21.

In use, the sensor is positioned with sensor front 12 engaging shank 52. The slanted surfaces 34, 36 and 56 engage opposite ends 14 of sensor 11 and hold the same in position. Wires 16 are then twined around the pins 41. By manipulation of handle 46 and arm 47 the sensor is positioned within the teeth of the patient in the desired position.

Directing attention now to FIGS. 5–6, a bite block 61 is illustrated which is used to hold the jaws of the patient apart during endodontic surgery. Thus block 61 has a body 62 formed with a downwardly proximally slanted bottom 63. Upstanding sides 64 perpendicular to bottom 63 converge proximally for a purpose which has heretofore been explained. Knobs 66 on the top edges 67 of sides 64 and knobs 68 on the bottom edges thereof are engaged by the teeth of the patient to hold the bite block 61 in position.

Clasp 81 comprises a body 82 which is rectangular in cross-section and has distal parallel extensions 83, the surfaces of which are formed with ratchet teeth 87. At the distal ends of extensions 83 are upstanding ends 84 and at the proximal end of body 82 is an upstanding arm 86.

In use, the clasp body 82 is inserted through the opening 72 and is aligned by fitting under upper guide 73 and over lower guide 74 so that it may move inwardly and outwardly relative to bite block 61 depending on the shape of the sensor 11 used therewith. By means of arm 86 the ends 84 are drawn inwardly so that the sensor 11 is gripped between the distal end of end 71 and the proximal surfaces of ends 84. By means of handle 76 the sensor is then placed in the proper position with regard to the teeth of the patient to be x-rayed. Because the sides 64 converge the shadow cast thereby upon the x-ray sensor is reduced.

The modification shown in FIG. 7 in many respects resembles that shown in FIGS. 3–4 and the same reference numerals followed by subscript are used to designate corresponding parts. As explained in U.S. Pat. 4,945,553, during root canal therapy a bite block, generally wedge-shaped, is incorporated in the holder to hold the patient's jaws apart to provide space for files inserted in teeth during such therapy.

Thus distally downwardly slanted longitudinal member 92 extends upward from shank 32a. At the proximal end of member 92 is transverse member 93 extending upward from distal end 24a. A secondary longitudinal member 94 extends proximally from about the midpoint of transverse member. To assist in enabling the teeth to grip body 22a, protrusions 96 may be formed on the top 97 of member 92 and protrusions 98 on the top 99 of member 93. One respect in which the modification of FIG. 7 differs from FIG. 3—is that there is but a single slanted edge 91 instead of slanted edges 34, 36, of FIGS. 3–4, but either construction may be used.

Preferably there are separate holders for left and right jaws, but the one is a mirror image of the other.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A holder for an X-ray sensor of the type having spaced, substantially rectangular front and back and peripheral side edges, said holder comprising a body configured for placement between the upper and lower teeth of a patient's mouth, a locating edge to engage said front of said sensor, a first gripper adjacent said locating edge shaped to engage a first side edge of said sensor, a second gripper adjacent said locating edge shaped to engage a second side edge of said sensor opposite said first side edge to retain said sensor lingually adjacent selected teeth when said body is gripped between said upper and lower teeth, said second gripper mounted on a clasp movable toward and away from said body, cooperating means on said clasp and said body to hold said clasp in a selected position of adjustment relative to said body, said body including a bite block shaped to hold the patient's jaws apart, said bite block having an opening in its center and having a proximal end at one end of said opening, a distal end opposite said proximal end and an opposed side interconnecting said ends, said distal end including said locating edge.

2. A holder according to claim 1 in which said grippers are formed with slanted surfaces to bias said sensor front toward said locating edge.

3. A holder according to claim 1 which further comprises a handle extending from said body to facilitate adjustment of said holder within the patient's mouth.

4. A holder according to claim 3 in which said sensor has a lead wire and which further comprises a grip for said wire on said holder.

5. A holder according to claim 1 in which said clasp is formed with a shank and said body is shaped to receive said shank.

6. A holder according to claim 5 which further comprises cooperating means on said clasp and said body to hold said clasp in a selected position of adjustment relative to said body.

7. A holder according to claim 6 in which said cooperating means comprise rachet teeth.

8. A holder according to claim 1 which further comprises an extension on said clasp, said body being shaped to receive said extension in a plurality of positions of adjustment parallel to said locating edge, which further comprises a second body on said clasp shaped to be gripped by the patient's teeth.

9. A holder according to claim 8 which further comprises inter engaging means on said extension and said body to hold clasp in position relative to said body.

10. A holder according to claim 8 which further comprises a bite block on said body positioned to hold a patient's jaws spaced apart in which said bite block includes a longitudinal member extending laterally substantially parallel to said locating edge.

11. A holder according to claim 1 which further comprises an extension on said clasp, said body being shaped to receive said extension, said clasp being movable toward and away from said locating edge.

12. A holder according to claim 11 which further comprises inter engaging means on said extension and said bite block to hold said clasp in a selected position of adjustment to said body.

13. A holder according to claim 12 in which said sides converge relative to said locating edge.

14. A holder for an X-ray sensor of the type having spaced, substantially rectangular front and back and peripheral side edges, said holder comprising a body configured for placement between the upper and lower teeth of a patient's mouth, a locating edge to engage said front of said sensor, a first gripper adjacent said locating edge shaped to engage a first side edge of said sensor, a second gripper adjacent said locating edge shaped to engage a second side edge of said sensor opposite said first side edge to retain said sensor lingually adjacent selected teeth when said body is gripped between said upper and lower teeth, said second gripper mounted on a clasp movable toward and away from said body, cooperating means on said clasp and said body to hold said clasp in a selected position of adjustment relative to said body, said body includes a bite block shaped to hold the patient's jaws apart, said bite block being formed with an opening bounded by an end wall substantially parallel to said locating edge, a first side substantially normal to said end wall, and a second side substantially parallel to said first side.

15. A holder according to claim 14 in which said second side and said second gripper are mounted on said clasp, said clasp being movable toward and away from said body generally parallel to said locating edge.

16. A holder according to claim 15 which further comprises an extension on said clasp, and inter engaging means on said extension and said body to hold said clasp in a selected position of adjustment relative to said body.

17. A holder according to claim 16 in which edges of said end and of said sides are formed with knobs.

18. A holder for a radiographic receiver comprising a bite block having first and second sides, said sides converging relative to a locating edge on said bite block, said sides having top and bottom surfaces shaped to fit between the upper and lower jaws of a patient, a distal end connecting said sides and forming said locating edge and a gripper on said distal end to engage said receiver and hold said receiver aligned with said locating edge.

19. A holder according to claim 18 which further comprises a clasp, said gripper being located on said clasp, said clasp having an shank, said bite block being shaped to receive said shank, said clasp being movable in a direction normal to said locating edge.

20. A holder according to claim 19 which further comprises inter engaging means on said shank and said bite block to hold said clasp in position relative to said bite block.

21. A holder according to claim 18 in which said top and bottom surfaces are converging.

22. A holder for an X-ray sensor of the type having spaced, substantially rectangular front and back and peripheral side edges, said holder comprising a body configured for placement between the upper and lower teeth of a patient's mouth, a locating edge to engage said front of said sensor, a first gripper adjacent said locating edge shaped to engage a first side edge of said sensor, a second gripper adjacent said locating edge shaped to engage a second side edge of said sensor opposite said first side edge to retain said sensor lingually adjacent selected teeth when said body is gripped between said upper and lower teeth, said second gripper mounted on a clasp movable toward and away from said body, cooperating means on said clasp and said body to hold said clasp in a selected position of adjustment relative to said body, an extension on said clasp, said body being shaped to receive said extension in a plurality of positions of adjustment parallel to said locating edge, a second body on said clasp shaped to be gripped by the patient's teeth, a bite block on said body positioned to hold a patient's jaws spaced apart in which said bite block includes a longitudinal member extending laterally substantially parallel to said locating edge, in which said projection has a top edge slanting downwardly distally.

23. A holder according to claim 22 which further comprises protrusions on said top edge to facilitate a patient's teeth in gripping said holder.

24. A holder according to claim 22 which further comprises a transverse member at an inner end of said longitudinal member.

25. A holder according to claim 24 which further comprises a secondary longitudinal member substantially parallel to said first-mentioned longitudinal member, and extending from the transverse member.

26. A holder according to claim 25 in which said secondary longitudinal member has a second top edge and which further comprises second protrusions on said second top edge.

* * * * *